US010391674B2

(12) United States Patent
Reichenberger et al.

(10) Patent No.: US 10,391,674 B2
(45) Date of Patent: Aug. 27, 2019

(54) DRIVE SHAFT WITH INSERTION DEVICE FOR GUIDING COOLING WATER

(71) Applicant: Hilti Aktiengesellschaft, Schaan (LI)

(72) Inventors: Thomas Reichenberger, Untermuehlhausen (DE); Jochen Erhardt, Klosterlechfeld (DE)

(73) Assignee: Hilti Aktiengesellschaft, Schaan (LI)

(*) Notice: Subject to any disclaimer, the term of this patent is extended or adjusted under 35 U.S.C. 154(b) by 114 days.

(21) Appl. No.: 15/321,966

(22) PCT Filed: Jun. 24, 2015

(86) PCT No.: PCT/EP2015/064204
§ 371 (c)(1),
(2) Date: Dec. 23, 2016

(87) PCT Pub. No.: WO2015/197665
PCT Pub. Date: Dec. 30, 2015

(65) Prior Publication Data
US 2017/0151692 A1   Jun. 1, 2017

(30) Foreign Application Priority Data
Jun. 25, 2014   (EP) .................................. 14173816

(51) Int. Cl.
*B28D 7/02* (2006.01)
*B23Q 11/12* (2006.01)
*B23Q 11/10* (2006.01)

(52) U.S. Cl.
CPC ............ *B28D 7/02* (2013.01); *B23Q 11/1015* (2013.01); *B23Q 11/127* (2013.01); *F16C 2322/39* (2013.01); *F16C 2352/00* (2013.01)

(58) Field of Classification Search
CPC ........ B28D 7/02; B28D 1/041; B23Q 11/127; B23Q 11/1015; B23Q 11/005; F16C 3/02; F16C 2322/39; F16C 2352/00
(Continued)

(56) References Cited

U.S. PATENT DOCUMENTS 3,215,443 A * 11/1965 Irving .................... E21B 21/02
                                                     175/214
4,268,197 A    5/1981 Burgsmueller
(Continued)

FOREIGN PATENT DOCUMENTS

DE        298 03 398 U1    6/1998
DE    10 2006 035 345 A1   4/2008
(Continued)

OTHER PUBLICATIONS

PCT/EP2015/064204, International Search Report (PCT/ISA/210 and PCT/ISA/220) dated Jul. 15, 2015, with partial English translation, enclosing Written Opinion of the International Searching Authority (PCT/ISA/237) (Twelve (12) pages).
(Continued)

*Primary Examiner* — Michael R Wills, III
(74) *Attorney, Agent, or Firm* — Crowell & Moring LLP

(57) ABSTRACT

A drive shaft for a machine tool, for example a core drilling machine, able to be connected to a drilling tool, in particular a core bit, is disclosed. The drive shaft contains a cavity which substantially extends over the whole length of the drive shaft and along the rotational axis. The cavity contains at least one inflow opening where, through the at least one inflow opening, water can be fed along the drive shaft into the drilling tool. In the drive shaft, an insertion device is provided in the cavity, through which water is guided for cooling the drive shaft, firstly, in a first direction and then in
(Continued)

a second direction, where the water comes into direct contact with the inner side of the cavity at least in the first direction.

9 Claims, 13 Drawing Sheets

(58) Field of Classification Search
USPC .......................................................... 408/56
See application file for complete search history.

(56) References Cited

U.S. PATENT DOCUMENTS

| | | | |
|---|---|---|---|
| 9,061,389 B2 * | 6/2015 | Uchiuzo | B23B 31/20 |
| 2005/0105977 A1 * | 5/2005 | Ishihara | B23B 51/06 |
| | | | 408/1 R |
| 2007/0014647 A1 * | 1/2007 | Watzke | B23B 31/02 |
| | | | 409/136 |

FOREIGN PATENT DOCUMENTS

| | | |
|---|---|---|
| EP | 0 458 499 A2 | 11/1991 |
| GB | 883684 A | 12/1961 |
| JP | 53-148091 A | 12/1978 |
| JP | 2005-145041 A | 6/2005 |

OTHER PUBLICATIONS

Machine English Translation of Previously Submitted B1 (DE 298 03 398 U1) (Four (4) pages).

* cited by examiner

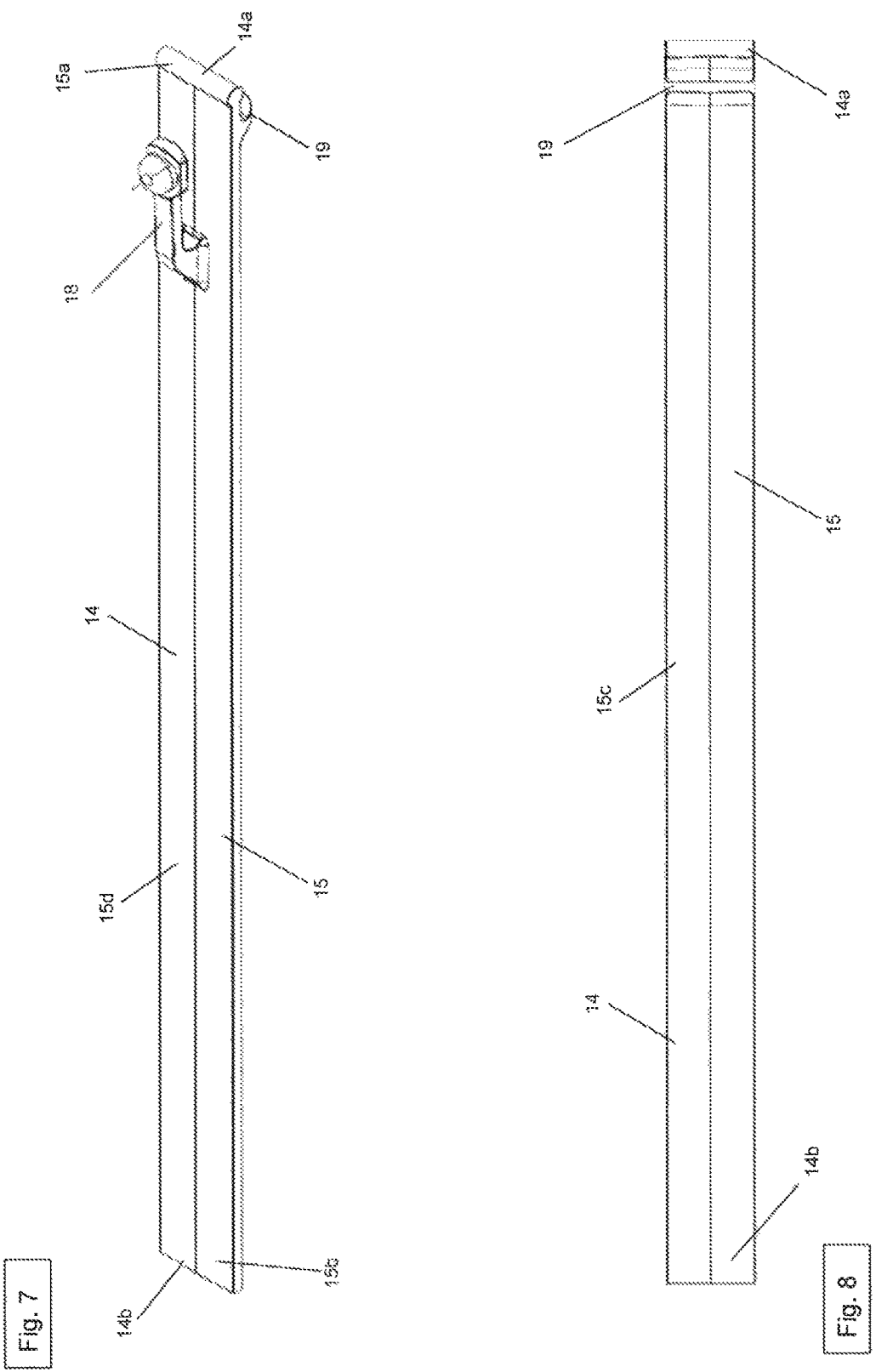

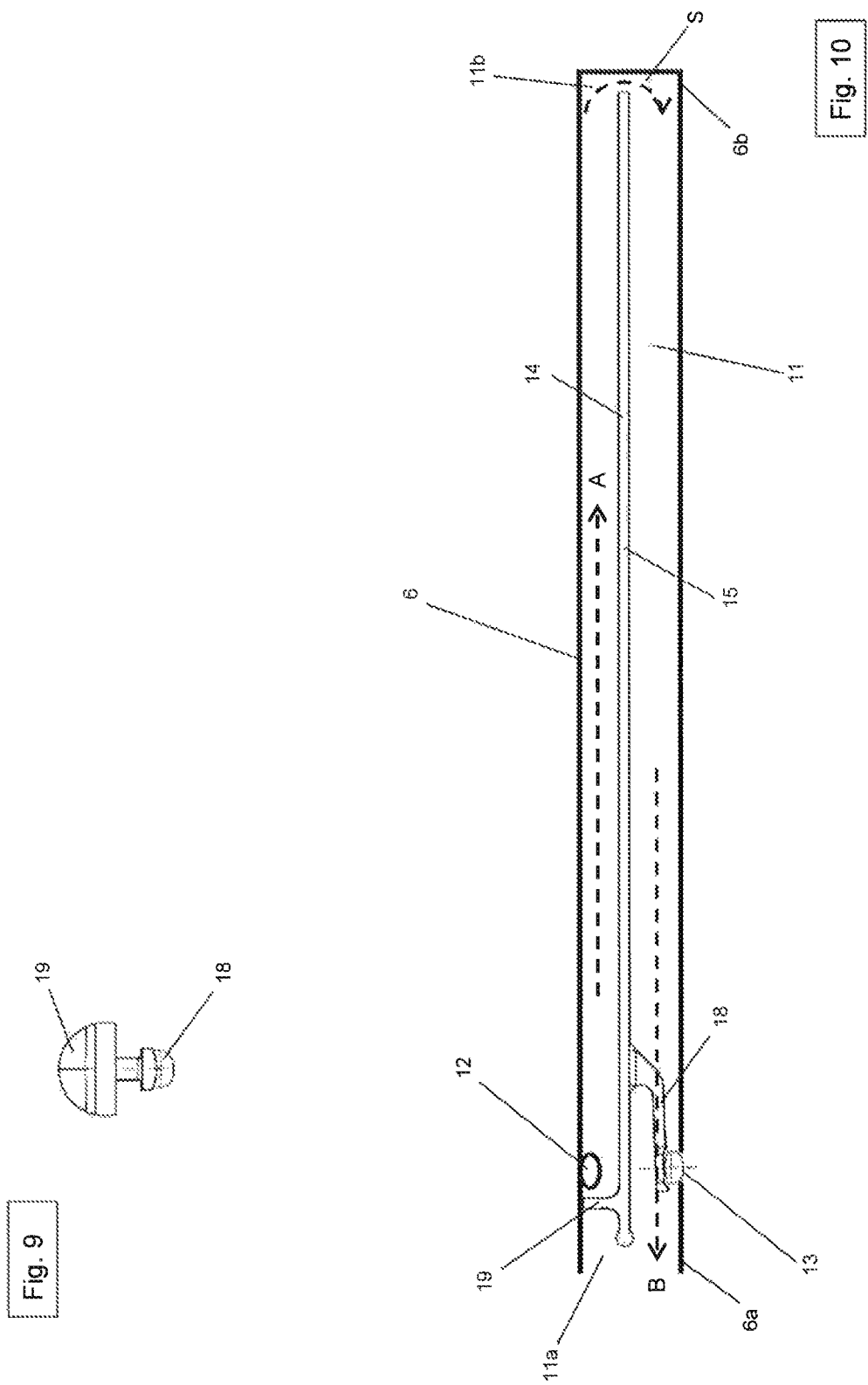

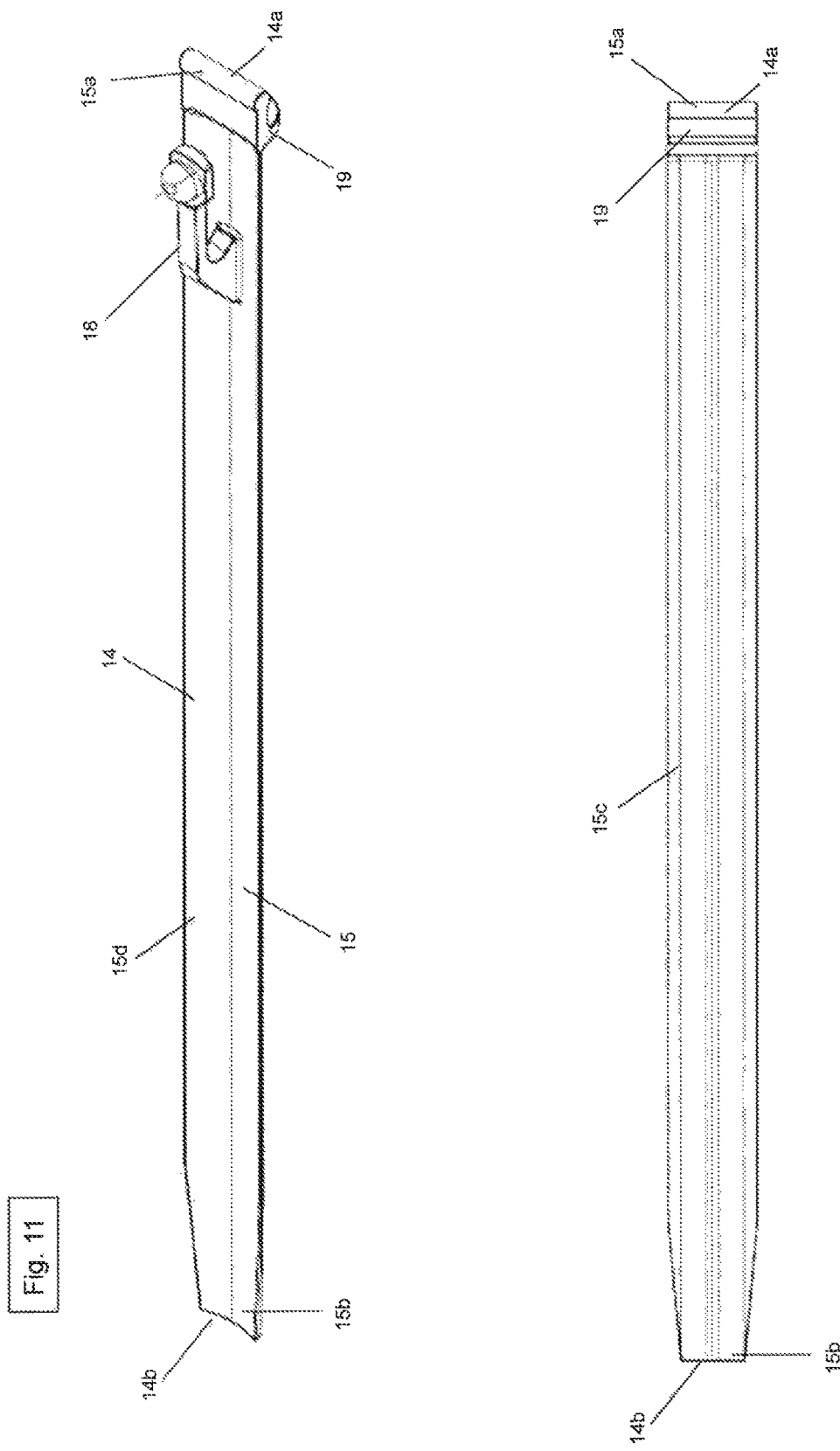

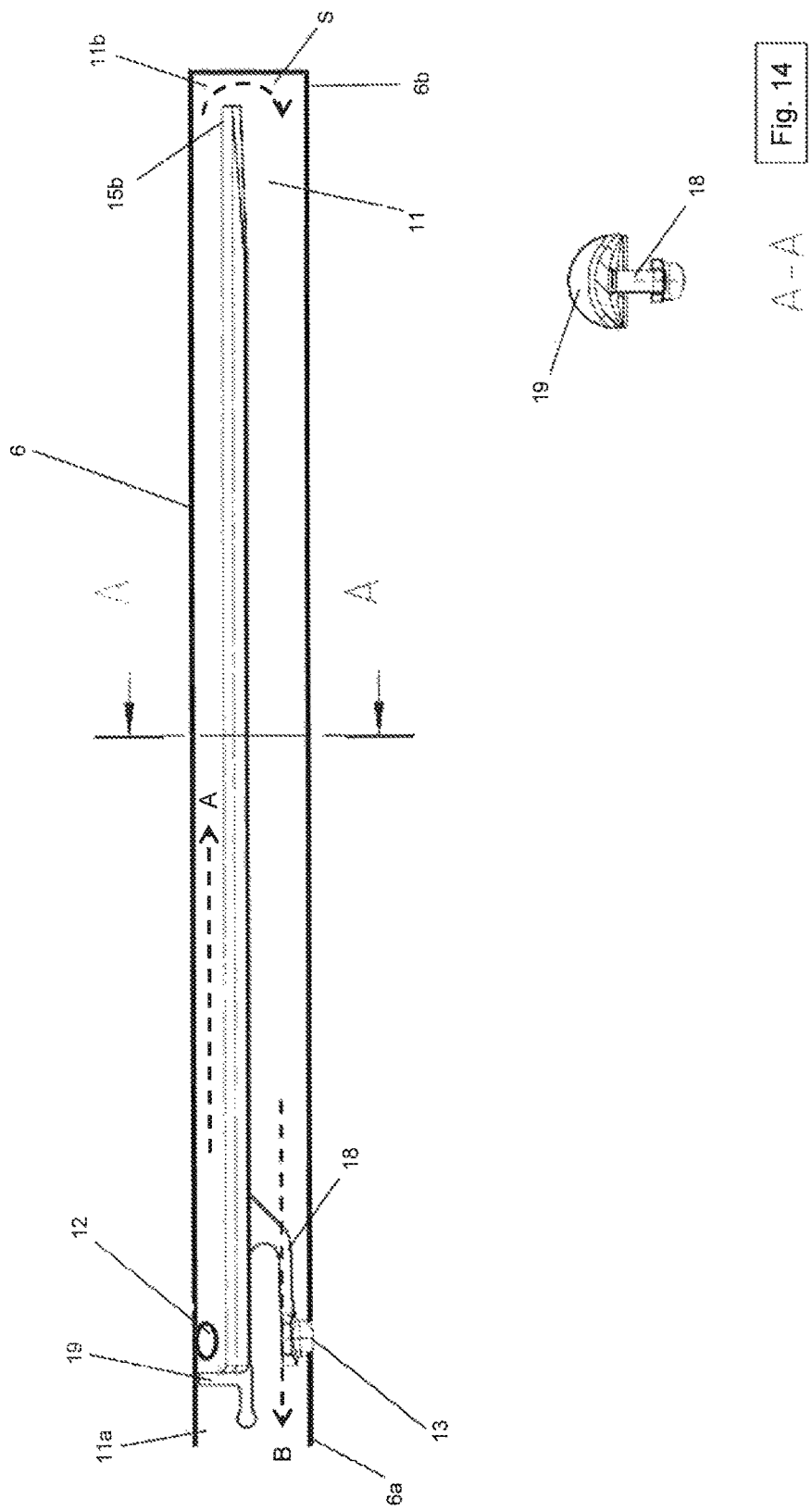

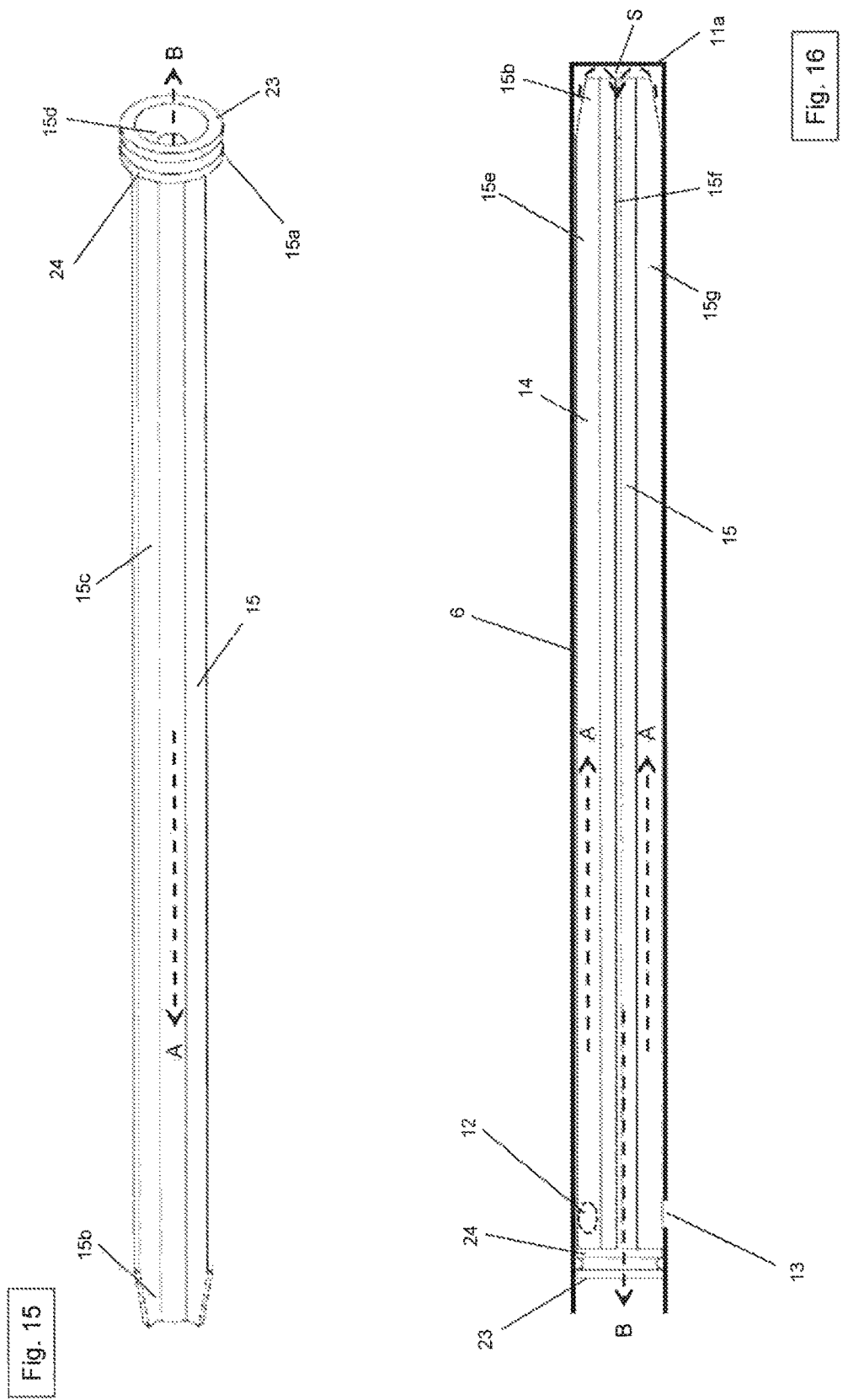

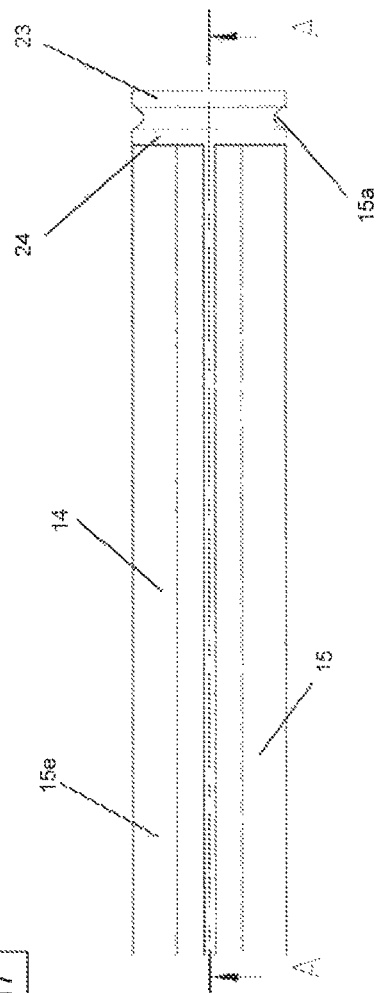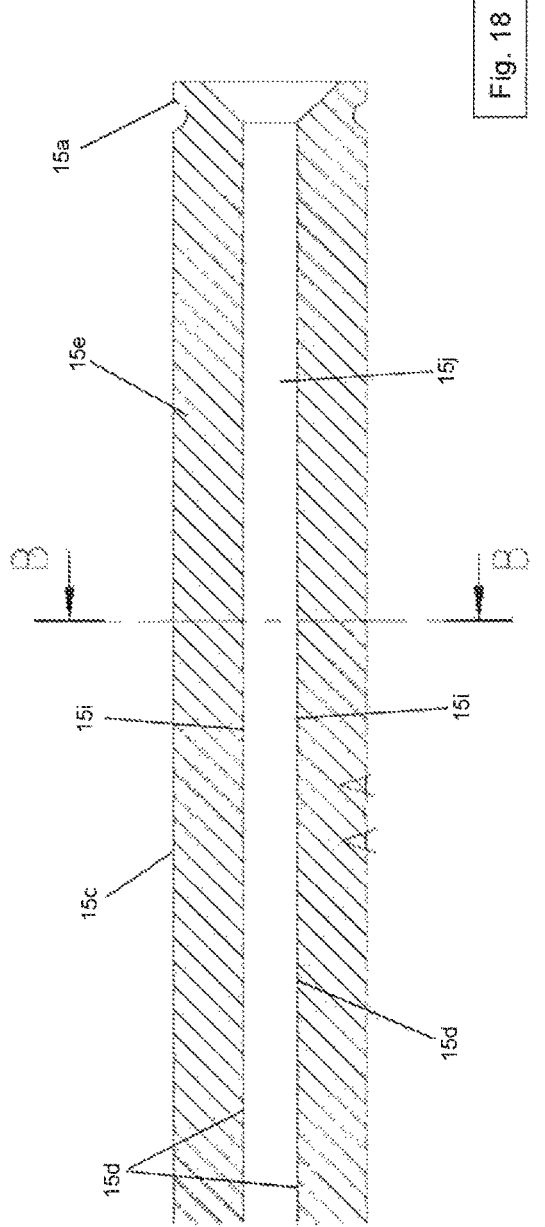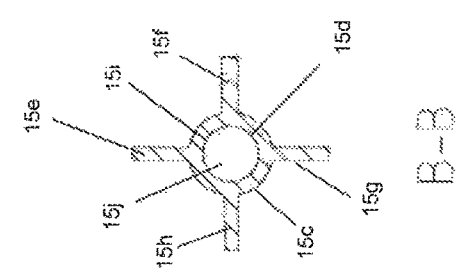

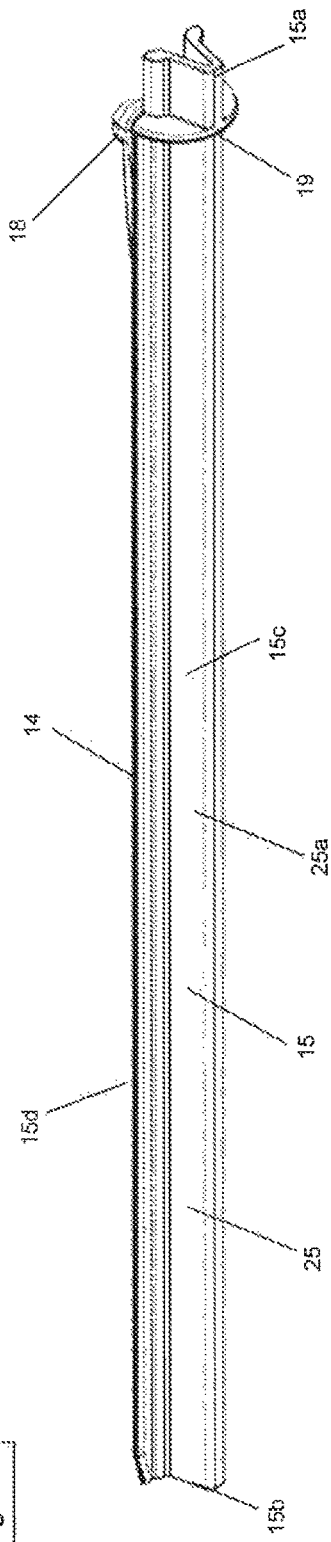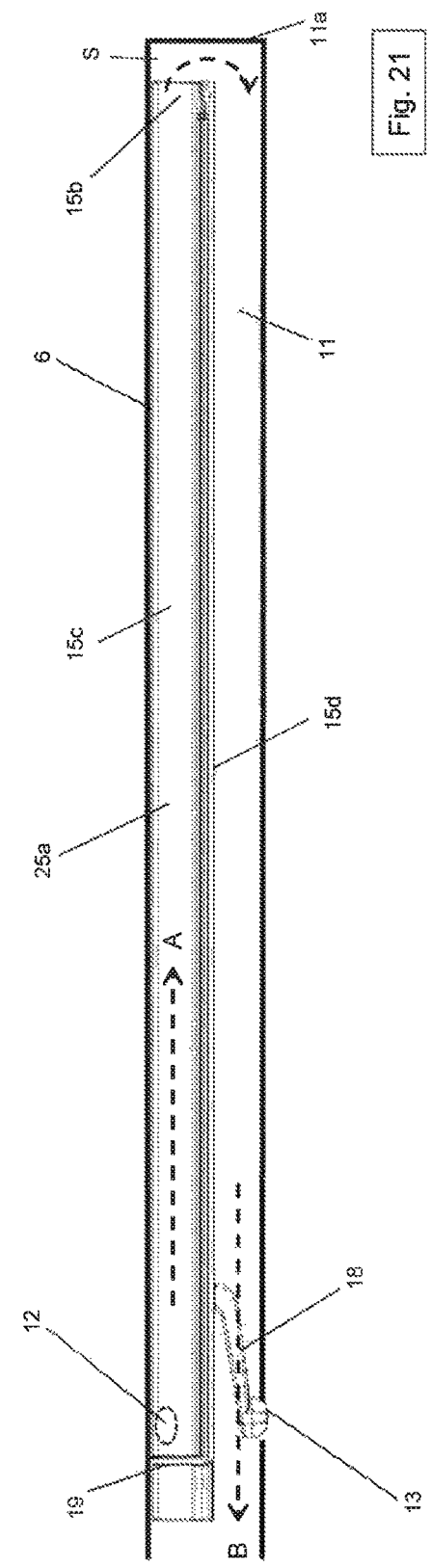

DRIVE SHAFT WITH INSERTION DEVICE FOR GUIDING COOLING WATER

This application claims the priority of International Application No. PCT/EP2015/064204, filed Jun. 24, 2015, and European Patent Document No. 14173816.1, filed Jun. 25, 2014, the disclosures of which are expressly incorporated by reference herein.

BACKGROUND AND SUMMARY OF THE INVENTION

The present invention relates to a drive shaft for a machine tool, for example a core drilling machine, able to be connected to a drilling tool, in particular a core bit, containing a cavity which substantially extends over the entire length of the drive shaft and along the rotational axis, wherein the cavity contains at least one inflow opening, wherein through the opening water can be fed along the drive shaft into the drilling tool.

A water supply system is an essential and indispensable necessity in almost all core drilling work as well as in numerous other works with large and powerful machine tools (such as, for example, saws, angle grinders or the like). Especially when using a core drill for drilling holes in mineral rock with a core bit rotationally offset from the core drill, flushing the drill bit is absolutely necessary. Through the water used for flushing the rock detached during core drilling and the resulting dust are washed out of the drill bit and from the borehole in the form of drilling mud. Without this flushing of the drilling mud, the drill bit would run hot in a very short time and thus set itself firmly in the well in a such a manner that further drilling is no longer possible.

A water supply system for use with a machine tool, such as a core drilling machine, according to the prior art is disclosed, for example, in the German patent application DE 10 2006 035 345 A1.

The core drills used in core drilling are often extremely powerful and accordingly have a high energy consumption. Moreover, the development of heat during the execution of core drilling work presents a considerable problem in core drilling. An excessive heat buildup inside a core drill can significantly reduce its performance and thus the efficiency of a core drill. Further, permanent damage to the entire core drill or individual components is also possible. In addition, there is also the risk that a user of the core drill can be injured by an excessively heated outer wall, which is caused by the heat generated inside the core drill.

It is therefore the object of the present invention to solve the problems described above, and in particular to provide a drive shaft for a machine tool, such as a core drill connectable with a drilling tool, in particular a drill bit, with which damage to the machine tool and heat-related injury to the user can be avoided effectively.

The present invention relates to a drive shaft for a machine tool, for example a core drilling machine, able to be connected to a drilling tool, in particular a core bit, containing a cavity which substantially extends over the entire length of the drive shaft and along the rotational axis, wherein the cavity contains at least one inflow opening, through which water can be fed along the drive shaft into the drilling tool.

The drive shaft is characterized according to the invention in that an insertion device is provided in the cavity, through which the water is then guided to cool the drive shaft first in a first direction and then in a second direction, wherein the water has direct contact with the inside of the cavity at least in the first direction. In this way, the water which is actually intended for flushing the drill bit is efficiently used for cooling the drive shaft and hence for cooling the core drill. By guiding the water into a first and a second direction, the water is passed through the cavity of the drive shaft longer, whereby higher heat absorption may be generated by the water and thus better cooling.

According to an advantageous embodiment of the present invention, it may be possible that the insertion device comprises a guide element, which contains at least a first surface for guiding the water in the first direction and a second surface for guiding the water in the second direction. By using a first and second surface on the guide element, a large contact area with the inner wall of the cavity and, consequently, the largest possible removal of heat, is generated.

In order to generate the largest possible volumetric flow rate for absorbing heat energy, it may be advantageous that the guide element is configured spirally along the cavity.

According to a further advantageous embodiment, it may be possible that the guide element is configured as a planar flat profile. Thus a low-cost and easy-to-manufacture guide member can be provided in a simple manner.

To produce a largest possible volume flow in the second direction, it may be useful for the guide element to be configured as a bent flat profile, wherein the first surface is convex and the second surface has a concave shape.

In order to produce the largest possible volume flow of the water in the first direction and so as to maximize heat absorption by the water, it may be advantageous for the guide element to include a longitudinal fold, wherein the first surface is positioned along the outer side of the longitudinal fold and the second surface is positioned along the inner of the longitudinal fold.

According to a further advantageous embodiment of the present invention, it may be advantageous that the guide element is configured as a tube, wherein the first surface is realized through the outer wall of the tube and the second surface by the inner wall of the tube. This allows the greatest possible flow of water in the first direction and so as to maximize the heat absorption generated by the water.

According to a further advantageous embodiment, it may be possible that at least one radially extending longitudinal rib is positioned on the outer wall of the tube. This water is guided as straight as possible in the first direction and stabilizes the guide element in the cavity.

In order to avoid an adverse twisting or slipping of the insertion device in the cavity, it may be expedient according to a further embodiment, that at the insertion device at least one holding device is provided which is engageable in a corresponding fixing element on the cavity and whereby a relative motion between the insertion device and the drive shaft is prevented.

Furthermore, it may be possible that the holding device is configured as a spring element. This enables the insertion device to equalize vibrations and shocks in the cavity, without it being changed from its envisaged position in the cavity.

Further advantages arise from the following description of the figures. In the figures, various embodiments of the present invention are shown. The figures, the description and the claims contain numerous features in combination. The expert will expediently also consider the features individually and combine them to form further reasonable combinations.

BRIEF DESCRIPTION OF THE DRAWINGS

FIG. 3a shows a cross-sectional view taken along the section line A-A in FIG. 3;

FIG. 7 is a perspective view of the insertion device according to a second embodiment;

FIG. 8 is a bottom view of the insertion device according to the second embodiment;

FIG. 9 is a front view of the insertion device according to the second embodiment;

FIG. 10 is a side view of the insert device according to the second embodiment;

FIG. 11 is a perspective view of the insertion device according to a third embodiment;

FIG. 12 is a bottom view of the insertion device according to the third embodiment;

FIG. 13 is a side view of the insertion device according to the third embodiment;

FIG. 14 is a cross-sectional view taken along section line A-A in FIG. 12;

FIG. 15 is a perspective view of the insertion device according to a fourth embodiment;

FIG. 16 is a first side view of the insertion device according to the fourth embodiment;

FIG. 17 is a second side view of the insertion device according to the fourth embodiment;

FIG. 18 is a longitudinal cross-section through the insertion device according to the fourth embodiment taken along the section line A-A in FIG. 16;

FIG. 19 is a cross-section through the insertion device according to the fourth embodiment taken along the section line B-B in FIG. 17;

FIG. 20 is a perspective view of the insertion device according to a fifth embodiment;

FIG. 21 is a side view of the insertion device according to the fifth embodiment;

DETAILED DESCRIPTION OF THE DRAWINGS

Figure 1:
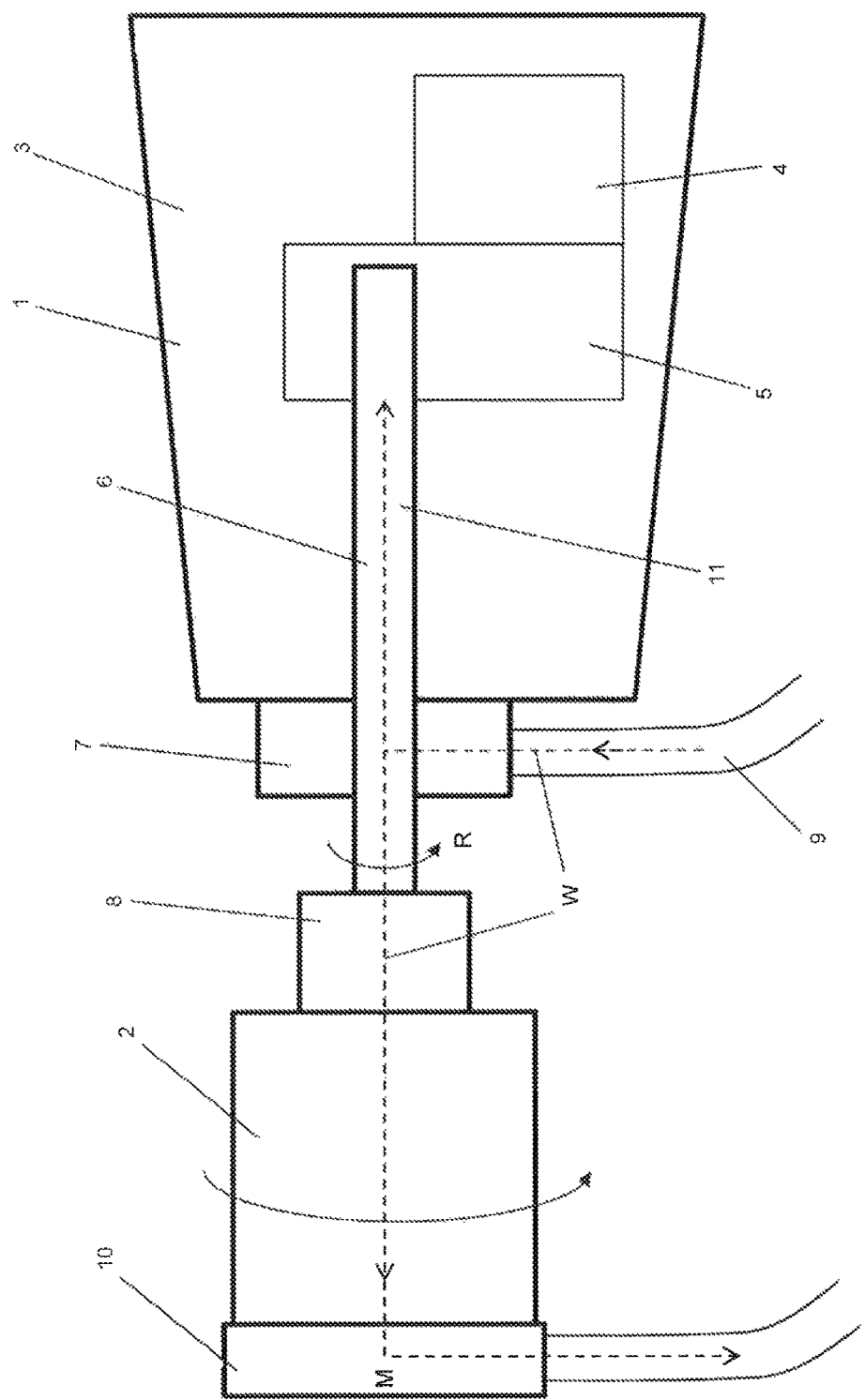
FIG. 1 is a schematic representation of a part of a core machine having a drill bit.

FIG. 1 shows a schematic representation of a machine tool 1 with a drilling tool 2. The machine tool 1 is shown in the form of a core drilling machine and the drilling tool 2 is shown in the form of a drill bit.

The core drilling machine 1 essentially comprises a housing 3, an electric motor 4, a transmission 5, a drive shaft 6, a flushing head 7 and a tool holder 8. The electric motor 4, the transmission 5 and a portion of the drive shaft 6 are positioned in the housing 3.

The electric motor 4 generates a torque and transmits it by means of the transmission 5 on the drive shaft 6, which is set in a rotational movement in the rotational direction R. The drive shaft 6 includes a first end 6a and a second end 6b. The first end 6a protrudes from the housing 3. The second end 6b is connected to the transmission 5 to accommodate the torque generated in the electric motor 4.

The tool receptacle 8 is positioned secured against rotation on the first end 6a of the drive shaft 6. Via the tool receptacle 8, the drive shaft 6 is connected secured against rotation to the tool configured as a drill bit 2. The drill bit 2 comprises a first end 2a and a second end 2b.

The flushing head 7 includes a water inlet 9, with which water W can be conveyed for cooling and flushing from a (not shown) water supply to the core drilling machine 1, the drive shaft 6 and in particular to the drill bit 2. On the first (front) end 2a of the drill bit 2, a suction device 10 is positioned, with which the rock and dust is removed from the drill bit 2 by the water in the form of drilling mud.

Figure 2:
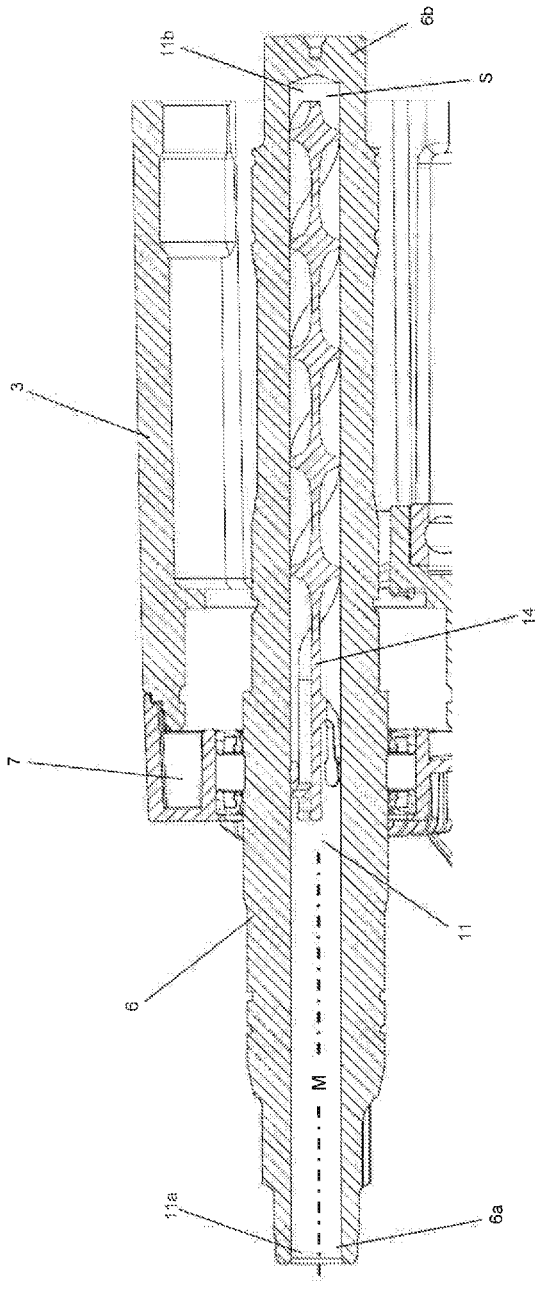
FIG. 2 is a longitudinal cross-section through a drive shaft of the core drilling machine and components of the housing of the core drilling machine.
Figure 3:
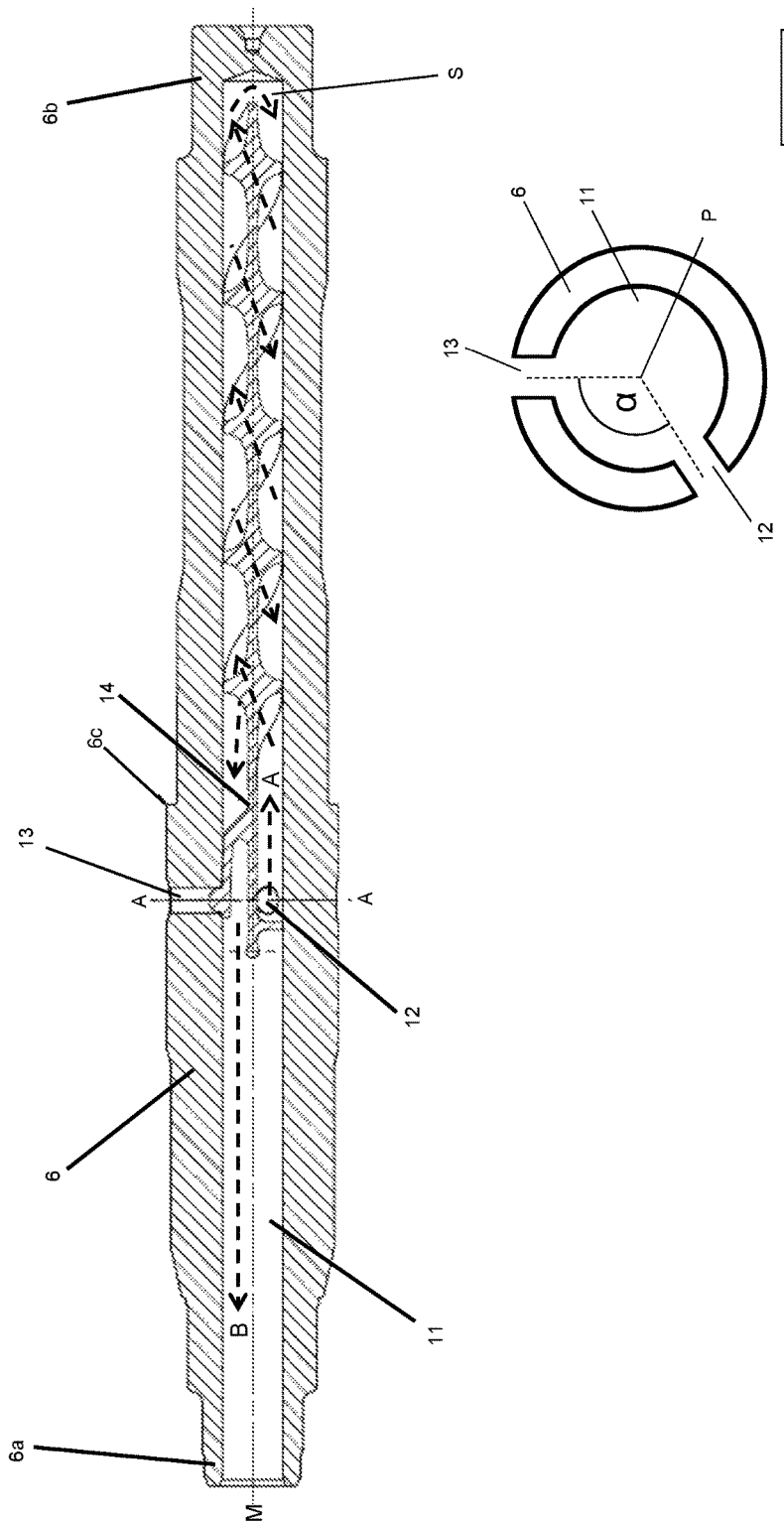
FIG. 3 is a longitudinal cross-section through the inventive drive shaft of the core drilling machine, together with an insertion device.
Figure 4:
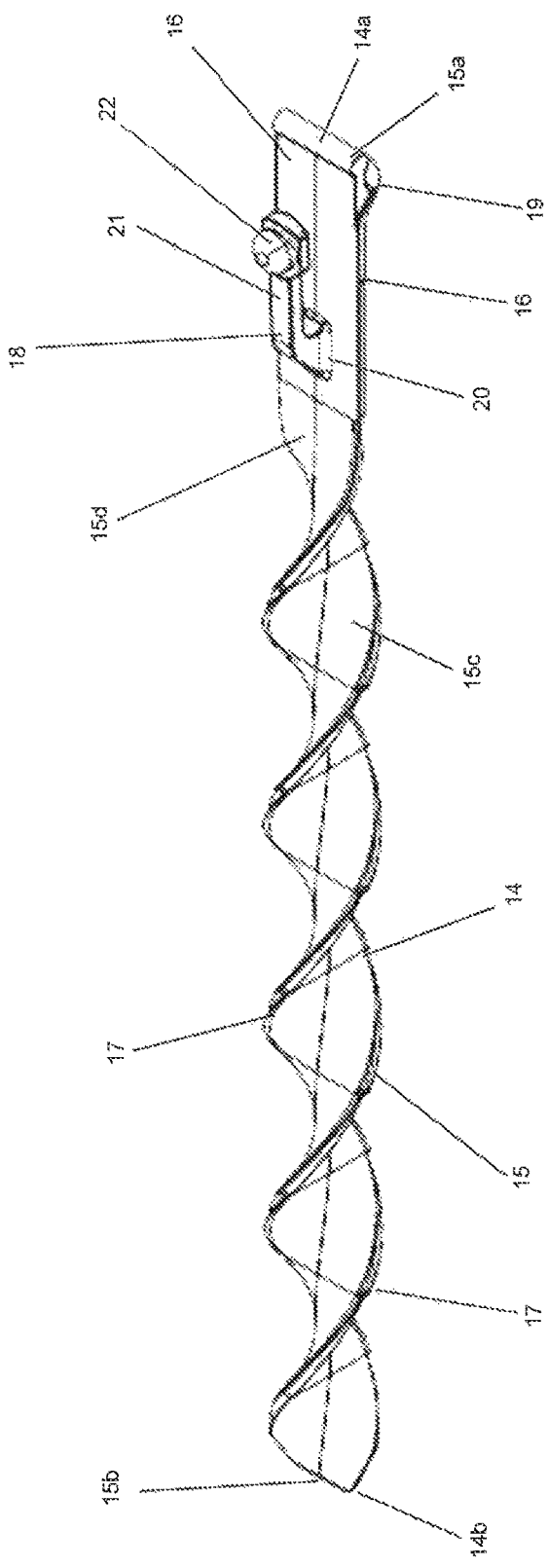
FIG. 4 is a perspective view of the insertion device according to a first embodiment.
Figure 5:
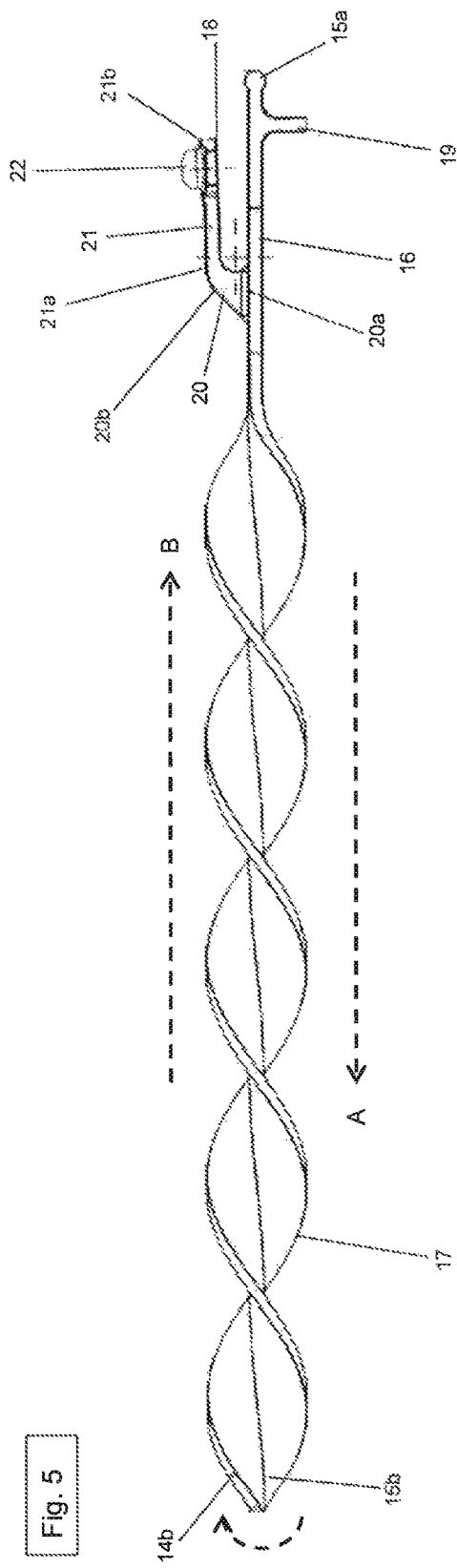
FIG. 5 is a side view of an insertion device according to the first embodiment.

FIG. 2 shows a cross section through the drive shaft 6 in a section of the housing 3 of the core drilling machine 1. The drive shaft 6 includes a cylindrical cavity 11 in the form of a blind hole. The blind hole 11 has a first end 11a and a second end 11b. The first end 11a represents the opening in the blind hole 11. The second end 11b is a closed end. As shown in FIGS. 2 and 3, in the outer wall or inner wall 6c the drive shaft 6 includes a first through-bore 12 and a second through-bore 13. The first and second through bore hole 12, 13 can allow water to reach in the interior of the drive shaft 6 and thus reach the cavity 11 configured as a blind hole. The first and second through-bores 12, 13 are substantially oppositely positioned in the shell wall 6c of the drive shaft 6. The first and second through-bore 12, 13 are positioned at a central angle α of greater than 90° to one another positioned (see FIG. 3a). The center point P of the center angle is located on the center axis M of the drive shaft. In the blind hole 11, the insertion device is positioned in a first embodiment (see. FIGS. 2, 3, 4).

In FIG. 2-5 an insertion device 14 is shown according to the first embodiment. As shown in FIGS. 2, 3, 4 and 5, the first embodiment of the insertion device 14 includes an elongated guide member configured as a thin plate 15. The insertion device 14 includes a first end 14a and a second end 14b. The guide member 15 has a first end 15a, a second end 15b, a first surface 15c and second surface 15d. Furthermore, the guide member 15 basically includes a first portion 16 and a second portion 17. The first portion 16 is configured as a straight piece and the second portion 17 is configured as a spiral piece. When the insertion device 14 is positioned in the blind hole 11, the second end 15b of the guide member 15 does not reach completely to the second end of the blind hole 11b. A certain gap S thus remains between the second end 15b of the guide member 15 and the second end 11b of the blind hole 11 (see. FIGS. 2 and 3).

At the first portion 16 of the guide member 15, a holding device 18 and a partition member 19 are provided.

The holding device 18 is configured in the form of a cantilever arm. The extension arm 18 includes a first section 20 and a second section 21. The first section 20 includes a first end 20a and a second end 20b. The second section 21 also includes a first end 21a and a second end 21b. The first end 20a of the first section 20 is positioned on the second surface 15d of the first portion 16 of the guide member 15. The first section 20 thus projects substantially perpendicular from the second surface 15d. The second end 21b of the first section 20 is connected at a right angle to the first end 21a of the second section 21. The second section 21 thus extends substantially parallel to the second surface 15*d* of the first portion 16. At the second end 21*b* of the second portion 21 a stop element 22 is mounted in the form of a hemisphere. The diameter of the hemisphere 22 substantially corresponds to the diameter of the first and second through-bore 12, 13. The holding device 18 serves to position the insertion device 14 in the cavity 11 in such a manner that it is prevented from rotating. For this purpose the stop element 22 is positioned in the second through-bore 13. The second through-bore 13 thus serves as a fixing element, into which the holding device 18 and in particular the stop element 22 can be introduced. By the arrangement of the first section 20 to the second section 21, the second section 21 can be moved relative to the first section 20. The insertion device 14 is thereby resiliently mounted in the cavity 11, since the holding device 18 acts as a spring element, so that even vibration or shock cannot move the insertion device 14 from the established position within the cavity 11.

Figure 6:
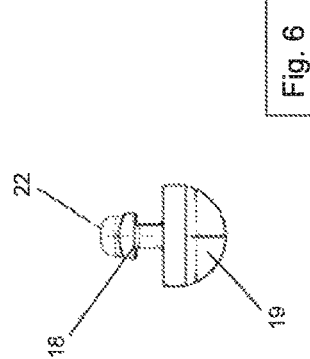
FIG. 6 is a front view of the insertion device according to the first embodiment.
Figure 22:
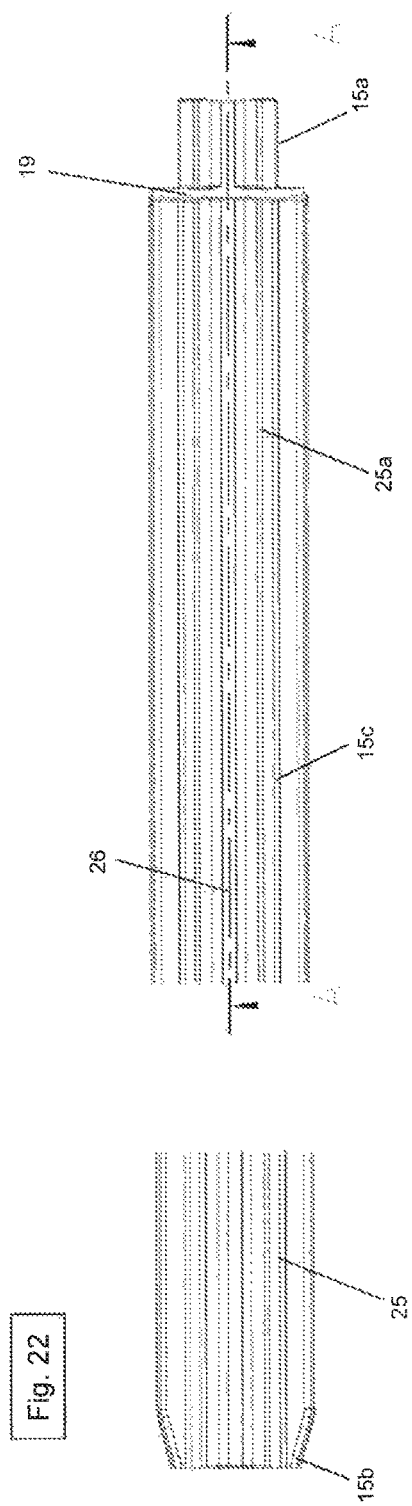
FIG. 22 is a bottom view of the insertion device according to the fifth embodiment.
Figure 23:
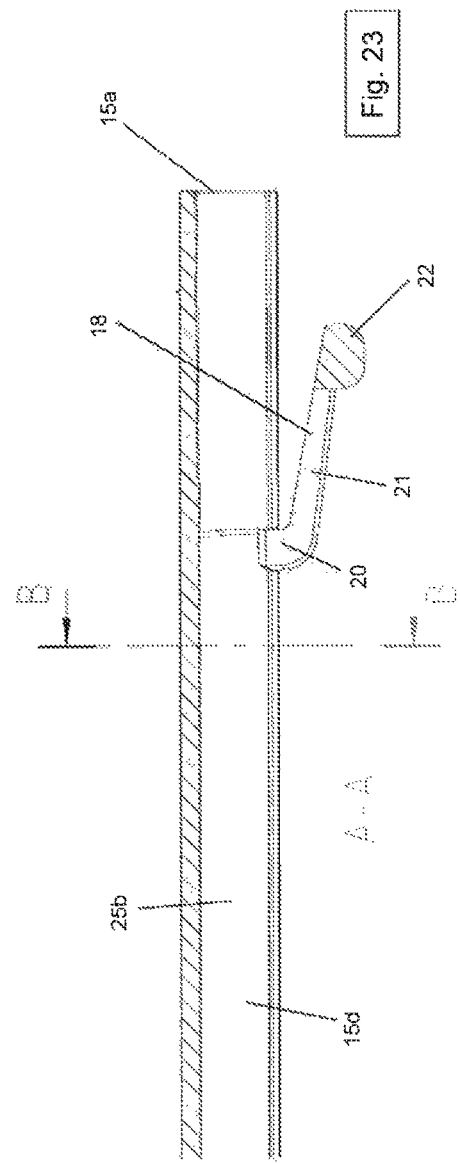
FIG. 23 is a longitudinal cross-section through the insertion device according to the fifth embodiment taken along the section line A-A in FIG. 21.
Figure 24:
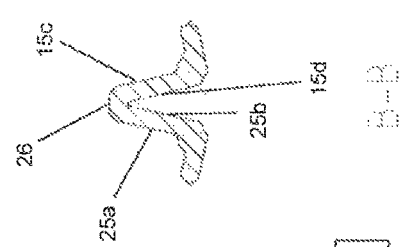
FIG. 24 is a cross section through the insertion device according to the fifth embodiment taken along the section line B-B in FIG. 22.

The partition element 19 is substantially configured in the form of a semi-circular plate and positioned on the first surface 15*c* in the first portion 16 of the guide member 15 (see FIG. 6). The partition element 19 is configured such that it closes the free space between the first surface 15*c* and the inner wall of the cavity 11. The partition element 19 thus ensures that the water at the first surface 15*c* can flow in the first direction A and cannot flow in the second direction B.

The first surface 15*c* serves to guide the water, which is conveyed for cooling and flushing into the drive shaft 6, in the first direction A, and the second surface 15*d* serves to guide the water in the second direction B. By means of the first surface 15*c* the water is conveyed to the second end 11*b* of the cavity 11 configured as a blind hole (direction). The water is in this case between the first surface 15*c* and the casing wall or inner wall 6*c* of the cavity 11.

When the water has arrived at the second end 15*b* of the guide member 15, the water enters from the first surface 15*c* through the gap S between the second end 15*b* of the guide member 15 and the second end 11*b* of the cavity 11 to the second surface 15*d*. Through this gap S, the water may be diverted around the guide member 15 and pass from the first surface 15*c* to the second surface 15*d* (see curved arrow in FIG. 5).

On the second surface 15*d*, the water is conveyed to the first end 11*a* of the cavity 11 configured as a blind hole (direction B). Through the open first end 6*a* of the drive shaft 6, the water passes through the hollow tool receptacle 8 to the drill bit configured as a drilling tool 2.

When the water is directed along the first and second surface 15*c*, 15*d* of the guide member 15, the water absorbs the heat energy of the core drill 1, and in particular of the drive shaft 6, and thus cools the core drilling machine 1 and the drive shaft 6.

FIGS. 7, 8, 9 and 10 show the insertion device 14 according to the second embodiment.

The second embodiment of the insertion device 14 includes an elongated guide member 15 configured as a thin plate. The insertion device 14 includes a first end 14*a* and a second end 14*b*. The guide member 15 has a first end 15*a*, a second end 15*b*, a first surface 15*c* and second surface 15*d*. The first and the second surface 15*c*, 15*d* are arranged in parallel. The guide member 15 is configured as a planar flat profile (see FIGS. 7 and 10). When the insertion device 14 is positioned in the blind hole 11, the second end 15*b* of the guide member 15 does not completely reach to the second end 11*b* of the blind hole 11. A certain gap S thus remains between the second end 15*b* of the guide member 15 and the second end 11*b* of the blind hole 11. Through this gap S, the water may be diverted around the guide member 15 and pass from the first surface 15*c* to the second surface 15*d* (see curved arrow in FIG. 10).

On the guide member 15 according to the second embodiment, a holding device 18 and a partition element 19 are provided. The holding device 18 and the partition element 19 on the insertion device 14 according to the second embodiment correspond to the holding device 18 and the partition element 19 of the insertion device 14 according to the first embodiment.

As already described above, the water is conveyed along the first surface 15*c* in the direction A and along the second surface 15*d* in the direction B before it passes out of the open first end 6*a* of the drive shaft 6 through the hollow tool holder 8 to the drill bit 2.

FIGS. 11, 12, 13 and 14 show the insertion device 14 according to the third embodiment.

The third embodiment of the insertion device 14 includes an elongated guide member 15 configured as a thin plate. The insertion device 14 includes a first end 14*a* and a second end 14*b*, The guide member 15 has a first end 15*a*, a second end 15*b*, a first surface 15*c* and second surface 15*d*. The guide member 15 is configured as a bent flat profile, wherein the first surface 15*c* has a convex shape and the second surface 15*d* has a concave shape (cf. FIGS. 11 and 14). When the insertion device 14 is positioned in the blind hole 11, the second end 15*b* of the guide member 15 does not completely reach to the second end 11*b* of the blind hole 11. A certain gap S thus remains between the second end 15*b* of the guide member 15 and the second end 11*b* of the blind hole 11. Through this gap S, the water may be diverted around the guide member 15 and pass from the first surface 15*c* to the second surface 15*d* (see curved arrow in FIG. 13).

On the guide member 15 a holding device 18 and a partition element 19 are provided. The holding device 18 and the partition element 19 on the insertion device 14 according to the third embodiment correspond to the holding device 18 and the partition element 19 of the insertion device 14 according to the first or second embodiment.

As already described above, the water is conveyed along the first surface 15*c* in the direction A and along the second surface 15*d* in the direction B before it passes out of the open first end 6*a* of the drive shaft 6 through the hollow tool holder 8 to the drill bit 2.

FIGS. 15, 16, 17, 18 and 19 show the insertion device 14 according to the fourth embodiment. The fourth embodiment of the insertion device 14 includes a guide element configured as a cylindrical tube 15. The insertion device 14 includes a first end 14*a* and a second end 14*b*. The guide member 15 has a first end 15*a*, a second end 15*b*, a first surface 15*c*, a second surface 15*d*, four longitudinal ribs 15*e*, 15*f*, 15*g*, 15*h* and a centric through-bore 15*j*. The first surface 15*c* extends along the outer surface of the tube 15. The second surface 15*d* extends along the inner side 15*i* of the tube 15 and around the central through-hole 15*j*. The water flows along the first surface 15*c* (direction A) on the outer side of the tube 15 from the first end 15*a* to second end 15*b* of the guide member 15. When the insertion device 14 is positioned in the blind hole 11, the second end 15*b* of the guide member 15 does not completely reach to the second end lib of the blind hole 11. A certain gap S thus remains between the second end 15*b* of the guide member 15 and the second end 11*b* of the blind hole 11. Through this gap S, the water may be diverted around the guide member 15 and pass from the first surface 15*c* to the second surface 15*d* (see curved arrow in FIG. 16). The water flows along the second surface 15d (direction B) on the inner side 15i of the tube 15 from the second end 15b to first end 15a of the guide member 15.

Furthermore a partition element 19, which substantially includes a first ring 23 and second ring 24, is provided on the guide member 15. The first ring 23 and second ring 24 are positioned one behind the other at the first end 14a of the insertion device 14 (see FIG. 15).

The four longitudinal ribs 15e, 15f, 15g, 15h extend from the second ring 24 along the outer side or the first surface 15c of the guide member 15 up to the second end 15d of the guide member 15. The four longitudinal ribs 15e, 15f, 15g, 15h are arranged at a uniform distance from one another.

At the second end 15d of the guide member 15, the four longitudinal ribs 15e, 15f, 15g, 15h flatten radially. When the insertion device 14 is positioned in the blind hole 11 of the drive shaft 6, the four longitudinal ribs 15e, 15f, 15g, 15h extend from the first surface 15c of the guide member 15 to the inner wall of the cavity 11 configured as a blind hole. Moreover, the first ring 23 and the second ring 24 is configured such that each extends from the first surface 15c of the guide member 15 up to the inner wall of the cavity configured as a blind hole 11. By the partition element 19 configured as a first and second ring 23, 24, it is thus ensured that water can flow to the first surface 15c only in the first direction A and not in the second direction B. The four longitudinal ribs 15e, 15f, 15g, 15h provide inter alia that the insertion device 14 is stably positioned in the blind hole 11. Since according to the fourth embodiment, on the insertion device 14 no holding device is provided, which is positioned in the second through-bore 13, water can also pass through the second through-bore 13 into the cavity 11 of the drive shaft 6 as well as to the first surface 15c of the guide member 15. It should be noted that in FIG. 16, the first through-bore 12 is only shown in ghosted (dashed circle), as in this view the first through-bore 12 is covered by one of the longitudinal ribs 15e, 15f, 15g, 15h.

FIGS. 20, 21, 22, 23 and 24 show insertion device according to the fifth embodiment. The fourth embodiment of the insertion device 14 includes a first end 14a and a second end 14b. Moreover, the insertion device 14 includes a guide member 15. The guide member 15 has a first end 15a, a second end 15b, a first surface 15c and second surface 15d. In addition, the guide member 15 includes a longitudinal fold 25 having an outer side 25a, an inner side 25b, and a ridge 26. The first surface 15c of the guide member 15 is positioned along the outer side 25a of the longitudinal fold 25 and the second surface 15d of the guide member 15 is positioned along the outer side 25a of the longitudinal fold 25. As already described above, the water flows through the first through-bore 12 into the cavity 11 of the drive shaft 6 and is conveyed along the first surface 15c in the direction A. When the insertion device 14 is positioned in the blind hole 11, the second end 15d of the guide member 15 does not completely reach to the second end 11b of the blind hole 11. A certain gap S thus remains between the second end 15b of the guide member 15 and the second end 11b of the blind hole 11. Through this gap S, the water may be diverted around the guide member 15 and pass from the first surface 15c to the second surface 15d (see curved arrow in FIG. 21). The water is conveyed to the second surface 15d in the direction B, in order to finally pass out from the open first end 6a of the drive shaft 6 through the hollow tool receptacle 8 to the drill bit 2.

Furthermore, a holding device 18 and a partition element 19 are provided on the guide element 15. The holding device 18 and the partition element 19 on the insertion device 14 according to the fifth embodiment correspond to the holding device 18 and the partition element 19 of the insertion device 14 according to the first, second or third embodiment. It should be noted that in FIG. 21, the first through-bore 12 is only shown phantomed (dashed circle), since the first through-bore 12 is hidden in this view by the longitudinal fold 25.

If the water which is intended for the flushing of the drill bit 2 passes through the first or second through hole 12, 13 into the cavity 11 of the drive shaft 6, the drive shaft 6 and thus the entire core drill 1 can be efficiently cooled. By guiding the water in a first direction A and a second direction B, the water is passed through the cavity 11 of the drive shaft 6 longer, whereby higher heat absorption by the water and thus efficient cooling of the drive shaft 6 and the entire core drill 1 can be produced.

The invention claimed is:

1. A drive shaft for a machine tool which is connectable to a drilling tool, comprising:
    a cavity, wherein the cavity substantially extends over an entire length of the drive shaft and along a rotational axis of the drive shaft and wherein the cavity contains an inflow opening through which water is feedable along the drive shaft into the drilling tool; and
    an insertion device disposed in the cavity, wherein the water is guidable through the insertion device to cool the drive shaft first in a first direction and then in a second direction, wherein the water has direct contact with an inner wall of the cavity at least in the first direction;
    wherein the machine tool is a core drill and wherein the drilling tool is a core bit.

2. The drive shaft according to claim 1, wherein the insertion device contains a guide element with a first surface for guiding the water in the first direction and a second surface for guiding the water in the second direction.

3. The drive shaft according to claim 2, wherein the guide element is configured as a bent flat profile and wherein the first surface has a convex shape and the second surface has a concave shape.

4. The drive shaft according to claim 2, wherein the guide element has a longitudinal fold, wherein the first surface is positioned along an outer side of the longitudinal fold, and wherein the second surface is positioned along an inner side of the longitudinal fold.

5. The drive shaft according to claim 2, wherein the guide element is configured as a tube, wherein the first surface is achieved by an outer wall of the tube and the second surface is achieved by an inner wall of the tube.

6. The drive shaft according to claim 1, wherein the guide element is configured spirally along the cavity.

7. The drive shaft according to claim 1, wherein the guide element is configured as a planar flat profile.

8. The drive shaft according to claim 1, further comprising a holding device on the insertion device, wherein the holding device is engageable in a fixing element on the cavity such that a relative motion between the insertion device and the drive shaft is prevented.

9. The drive shaft according to claim 8, wherein the holding device is a spring element.

* * * * *